May 30, 1939.　　　　R. A. SANDBERG　　　　2,160,680
METHOD OF MANUFACTURING RECEIVER TANKS
Filed Dec. 19, 1935　　2 Sheets-Sheet 1
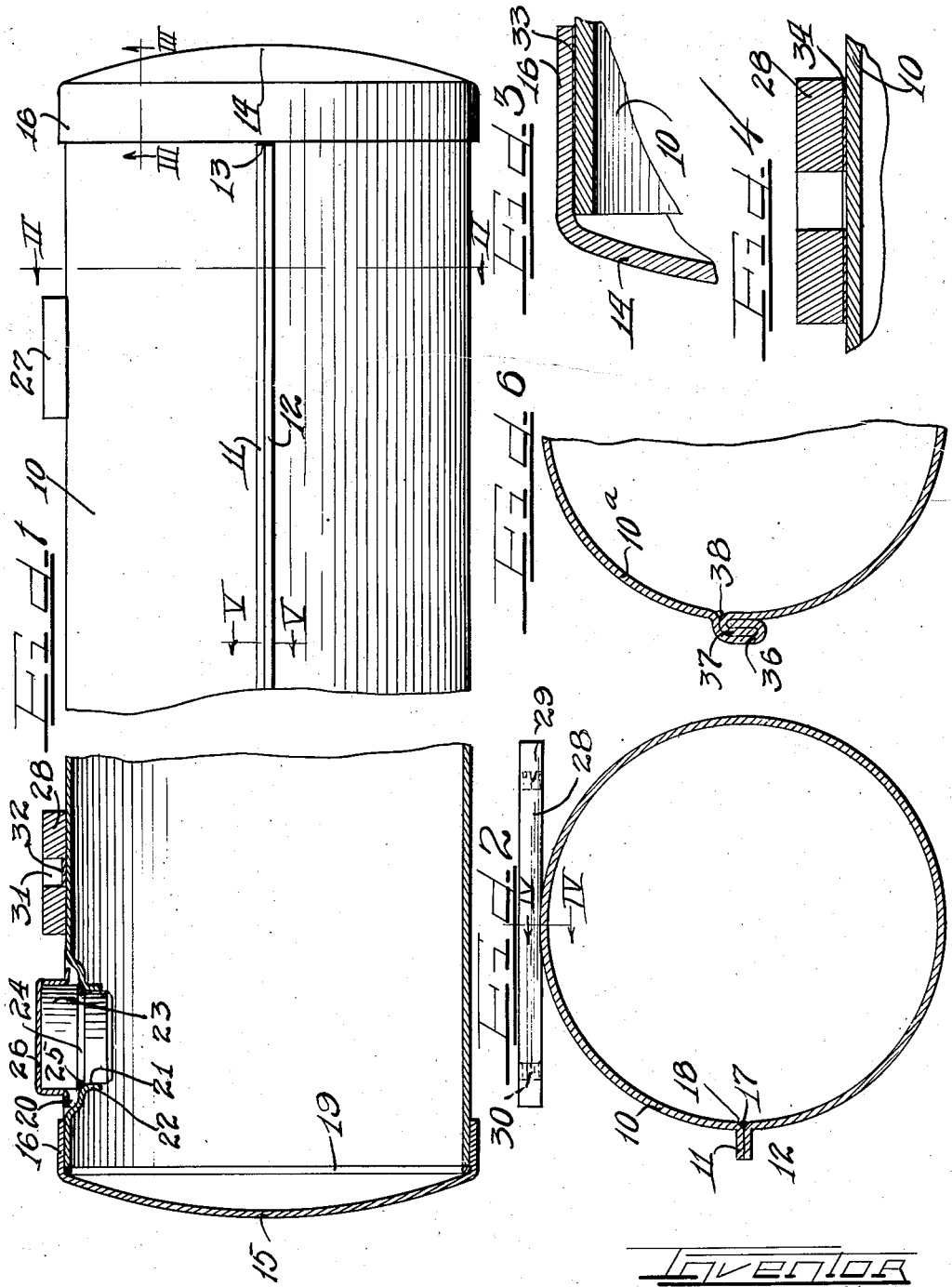

May 30, 1939.  R. A. SANDBERG  2,160,680
METHOD OF MANUFACTURING RECEIVER TANKS
Filed Dec. 19, 1935   2 Sheets-Sheet 2
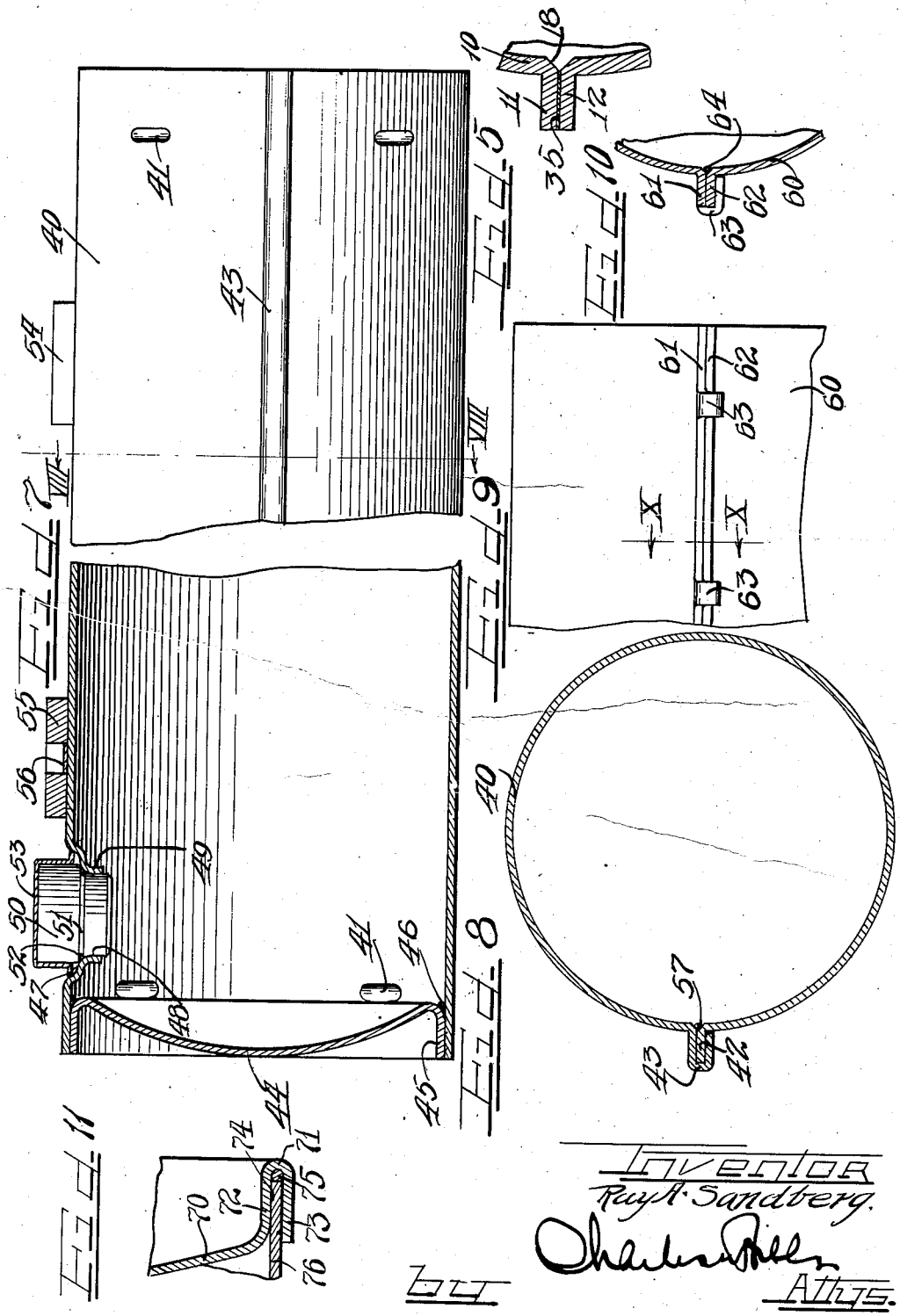

Patented May 30, 1939

2,160,680

UNITED STATES PATENT OFFICE 2,160,680

METHOD OF MANUFACTURING RECEIVER TANKS

Ray A. Sandberg, Waukegan, Ill., assignor, by mesne assignments, to Houdaille-Hershey Corporation, Detroit, Mich., a corporation of Michigan Application December 19, 1935, Serial No. 55,183

2 Claims. (Cl. 113—120)

This invention relates to metal containers for material such as refrigerants and the like and to a process of making these containers from sheet metal.

More specifically this invention relates to air-tight receivers for liquid refrigerants fabricated from sheet metal and having all of the joints thereof permanently sealed by a brazing operation.

In refrigerating systems of the compressor-condenser-evaporator type it is customary to flow compressed and/or liquefied refrigerants from the condenser to a receiver tank where it is collected for use as needed in the evaporator. These receiver tanks must be absolutely air-tight and leak proof and at the same time must be strong enough to withhold the pressures of the high side of the refrigerating system.

Receiver tanks have heretofore been fabricated from seamless drawn tubing which must necessarily be of a comparatively large diameter for tubing. This large diameter seamless tubing is quite expensive to manufacture and therefore materially increases the production cost of the receiver tank.

I have now provided a method of manufacturing receiver tanks wherein all of the parts forming the tank walls are fabricated from sheet metal. According to this invention the sheet metal parts are integrally brazed together to form air-tight joints, in a single heat treating operation. Heretofore these parts have been secured to a seamless tube by soldering or welding operations which are not entirely satisfactory since the soldered joints are not strong and the welded joints destroy desired metallurgical properties of the shell metal.

It is therefore an object of this invention to provide air-tight containers from sheet metal.

Another object of this invention is to provide receiver tanks for use in refrigerating systems, from sheet metal.

A further object of this invention is to decrease the cost of fabricating liquid receiver tanks for refrigerating systems.

A further object of this invention is to provide a method of fabricating liquid receivers from sheet steel.

Another object of this invention is to provide a process of making refrigerant receiver tanks having a plurality of air-tight joints or seams formed in a single heat treating operation.

Other and further objects of this invention will become apparent from the following detailed description of the annexed sheets of drawings which disclose preferred embodiments of this invention.

On the drawings:

Figure 1 is a broken side elevational view, partly in vertical cross section illustrating one form of receiver tank according to this invention, showing the parts thereof assembled for the brazing operation.

Figure 2 is a vertical cross sectional view, with a part in elevation, taken substantially along the lines II—II of Figure 1.

Figure 3 is an enlarged fragmentary cross sectional view taken substantially along the lines III—III of Figure 1, illustrating the manner in which the ends of the tank are brazed on the side walls of the tank.

Figure 4 is an enlarged fragmentary cross sectional view taken substantially along the lines IV—IV of Figure 2, illustrating the manner in which the supporting brackets are brazed to the side wall of the receiver tank.

Figure 5 is an enlarged fragmentary cross sectional view taken substantially along the lines V—V of Figure 1, illustrating the brazed joint for sealing together the ends of the metal sheet forming the side wall of the receiver tank.

Figure 6 is a fragmentary vertical cross sectional view taken through the side wall of an alternative form of receiver according to this invention illustrating an interlocking seam for the ends of the sheet metal forming the side wall.

Figure 7 is a broken side elevational view, with parts in vertical cross section, of an alternative form of receiver tank according to this invention showing the parts thereof assembled for the brazing operation.

Figure 8 is a vertical cross sectional view taken substantially along the lines VIII—VIII of Figure 7.

Figure 9 is a fragmentary side elevational view illustrating another alternative method of securing the ends of the sheet metal forming the side wall of the receiver.

Figure 10 is an enlarged fragmentary vertical cross sectional view taken substantially along the lines X—X of Figure 9.

Figure 11 is a fragmentary cross sectional view of another alternative form of end cap for receiver tanks of this invention.

As shown on the drawings:

In Figures 1 and 2, the reference numeral 10 indicates the cylindrical metal wall of the receiver tank. This wall 10 is formed from a flat rectangular strip of sheet steel. Opposite ends of the sheet of steel are bent at right angles to the sheet to form flanges 11 and 12. The sheet is then bent around a cylindrical mandrel to form the wall 10 with the flanges 11 and 12 brought together in abutting relation. The flanges 11 and 12 are preferably cut off at a point spaced from the ends of the tubular side wall 10 so as to terminate at 13 as shown in Figure 1. This permits depending skirts 16 of end caps 14 and 15 to be slipped over the ends of the wall as is shown. The skirts 16 of the cap members 14 and 15 fit snugly around the ends of the cylinder 10.

Before the caps 14 and 15 are seated in position, however, a brazing wire 17 is laid along the entire length of the wall 10 as shown in Figure 2 preferably in a groove 18 formed adjacent the abutting flanges 11 and 12. Brazing wires such as 19 (Fig. 1) are also disposed over the ends of the cylindrical wall 10. When the caps 14 and 15 are then telescoped over these ends as shown in Figure 1, the brazing wires are held in position.

The cylindrical wall 10 is indented as shown at 20 and pierced to form a circular opening 21 defined by a vertical flange 22. A boss or apertured plug 23 is seated snugly against the flange 22 and is provided with a groove or shoulder 24 intermediate the ends thereof. A brazing wire 25 is seated around the groove or shoulder 24 in abutting relation to the flange 22. The boss 23 may be covered with a cheap stamped cap 26 for protection against damage in shipping.

The receiver is provided with a pair of supporting brackets 27 and 28 having threaded openings 29 and 30 (Fig. 2) near the ends thereof for receiving supporting bolts (as shown). The brackets 27 and 28 are also provided with central openings such as 31 (Fig. 1). A button of brazing material 32 is placed in the opening 31.

The above-described assembly is next placed in a brazing furnace having a reducing atmosphere and heated to temperatures above the melting point of the brazing wires and ribbons but below the softening point of the steel forming the container unit. The brazing metal, in the molten state, has a very high capillary affinity for the metal of the receiver and flows by capillary force along all contacting surfaces of the metal to fuse therewith and form an air-tight brazed seal.

I prefer to use a brazing metal composed of copper, brass or bronze. The temperatures in the brazing furnace are merely sufficient to melt the brazing metal so that it can flow freely between all contacting surfaces of the steel forming the receiver tank. Temperatures around 2040° F. are preferably used for brazing with copper while temperatures below 2040° F., for example, around 1800° F. are sufficient when using bronze brazing wires.

The reducing atmosphere in the brazing furnace may be formed by flowing hydrogen therein or any other non-oxidizing gas such as for example nitrogen, carbon-dioxide and the like.

After the heat treatment in the brazing furnace the receiver tank is gradually cooled, preferably in a non-oxidizing atmosphere until the brazed joints are below their solidification temperature. The completed receiver assembly contains the brazed joints indicated in Figures 3 to 5.

As shown in Figure 3 the skirt 16 of the cap 14 is integrally brazed to the cylindrical side wall 10 by a brazed joint indicated at 33.

As shown in Figure 4, the supporting brackets such as 28 are integrally brazed to the wall 10 of the container by a brazed seal or joint 34. The brazing metal 32 which was disposed in the opening 31 of the supporting bracket upon melting flows by capillary action between the contacting surfaces of the supporting bracket and the cylindrical wall 10 to fuse therewith and form the brazed joint 34.

In Figure 5, the abutting flanges 11 and 12 of the sheet metal wall 10 are permanently sealed together by the brazed joint 35. The brazing wire 17 which was placed in the groove 18 adjacent the flanges 11 and 12 was, of course, melted down during the brazing operation and its capillary affinity for the steel of the wall 10 has caused this metal to force its way between the abutting flanges 11 and 12.

As shown in Figure 6, the wall 10a of an alternative form of receiver tank can be sealed at its abutting edges after being bent into a cylindrical form around a mandrel by providing a double lapped seam. As shown in Figure 6, flanges 36 and 37 can be formed on the adjacent edges of the wall 10a with the flange 36 bent around the flange 37. The thus folded seam can next be bent against the wall 10a to form the double lapped seam. A brazing wire 38 can be laid along the inside of the seam in the cylindrical wall 10a and when melted down will flow between the contacting surfaces of the flanges 36 and 37 to integrally unite said flanges together with a brazed seal.

In Figures 7 and 8 the reference numeral 40 indicates a cylindrical wall for an alternative form of receiver tank. The wall 40 is formed from a flat rectangular sheet of steel which can be stamped intermediate the ends thereof to form inside beads such as 41. The sheet of steel is then bent into cylindrical form and flanges 42 and 43 are provided at the abutting ends of the sheet. Instead of utilizing only a single line of contact for the flanges 42 and 43 as is provided in Figures 1 and 2, however, an interlocking seam may be provided by bending the flange 43 around the flange 42 as shown in Figure 8. This forms a tight seam which, as will hereinafter be described, is integrally brazed together.

Instead of using outside cap members as shown in Figure 1, inside cap members such as 44 can be used. These members have reversed skirt portions 45 adapted to fit into the cylindrical wall 40 in tight engagement therewith. The caps are inserted until they abut the inturned beads 41. A brazing wire 46 is disposed around the inside edges of the cap members 44 as shown to integrally braze the skirts 45 of these cap members to the ends of the cylindrical wall 40.

The wall 40 is indented, in a manner similar to the wall 10, to provide an inturned well 47 the bottom of which is pierced to form a circular opening 48 defined by a vertical flange 49 adapted to receive an apertured plug or boss 50 having a shoulder or groove portion 51 with a brazing wire 52 seated therein for joining the boss integrally with the flange 49. A cheap cap metal cover 53 may be disposed over the boss 50 to protect the same against damage.

Brackets 54 and 55 are brazed to the wall 40 in an identical manner described in Figures 1, 2, and 4 by means of the brazing metal 56 disposed in an apertured opening to the brackets.

As shown in Figure 8, a brazing wire 57 is laid along the abutting edges of the wall 40.

The above-described assembly is then placed in the brazing furnace as described above and the brazing wires 46, 52, 56 and 57 form airtight brazed joints in a single heating operation to integrally unite the parts of the receiver tank.

In Figures 9 and 10 there is shown an alternative manner of forming the cylindrical wall for a receiver tank according to this invention. As shown in these figures the reference numeral 60 indicates a sheet steel member bent into a cylindrical form and provided with abutting outturned flanges 61 and 62. However, the flange 61 is provided at spaced points with extending tabs 63 which are turned around the flange 62 as shown in Figure 10 to clamp the flanges together. A brazing wire 64 is laid along inside of the cylindrically formed steel sheet 60 adjacent the flanges 61 and 62 thereof and, during the brazing operation, is melted down and flows by capillary attraction between the contacting surfaces of the flanges to integrally unite these flanges together and form an air-tight brazed joint.

In Figure 11 there is illustrated another alternative arrangement for mounting end caps on the cylindrical wall member of the tank. According to this modification, an end cap 70 is formed with a turned back peripheral flange 71 to provide parallel wall portions 72 and 73 in spaced relation defining an annular well 74. A brazing wire 75 may readily be disposed in the well 74 and the cap 70 can then be slipped over the end of the cylindrical wall member 76. This end portion is thus seated in the well 74 in frictional engagement with walls 72 and 73 thereof and the wire 75 is held against displacement. The assembly is heated as described above and the wire 75 melts down, flows by capillary action between the walls of the well and the cylindrical side wall member and brazes the cap to the side wall member.

From the above description it should be understood that I have now provided a simple method of fabricating receiver tanks from sheet metal. This method involves a single heat treatment to simultaneously effect a brazing of all of the constituent parts of the receiver tank. The side wall of the receiver tank is formed of sheet steel and dispenses with the necessity of using more expensive large diameter seamless tubing. The side wall can have one or more openings such as 21 or 48 formed therein. Likewise the end cap can have openings therein, if desired, with fittings brazed thereto.

Instead of using brazing wires for effecting integral connections between the various elements of the tanks, these elements can be electrolytically copper plated or merely dusted with a copper or bronze brazing powder. For example the cap members and the fittings can very readily be copper plated.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A method of making a receiver tank for refrigerating systems which comprises forming a sheet of metal into a tube with adjoining edges flanged outwardly to form substantially contacting surfaces, disposing skirted cap members across the open ends of the tube with the skirts in extended contact with the tube, piercing the metal sheet to form an inturned annular flange in the tube, disposing an apertured plug in the opening defined by said flange in extended contact with the flange, disposing brazing wires adjacent to the contacting surfaces and heating the assembly in a non-oxidizing atmosphere to melt the wires and integrally braze together the contacting surfaces.

2. The method of manufacturing a tank which comprises bending a sheet of metal into tubular form with adjoining edges flanged to form substantially contacting surfaces, disposing skirted cap members across the open ends of the thus formed tube with the skirts in extended contact with the tube, piercing the metal sheet to form an inturned flange in the tube, disposing a plug in the opening defined by said flange in extended contact with the flange, disposing brazing material adjacent to all contacting metal surfaces and heating the assembly in a non-oxidizing atmosphere to brazing temperature for integrally brazing together the contacting surfaces to form an integral unit.

RAY A. SANDBERG.